2,984,679

PROCESS FOR PREPARING CASTOR OIL-EPOXIDIZED CASTOR OIL-ARYLENE DIISOCYANATE REACTION PRODUCT

Arthur Ehrlich, Brooklyn, N.Y., and Malcolm Kent Smith, Westfield, N.J., assignors to The Baker Castor Oil Company, Jersey City, N.J., a corporation of New Jersey No Drawing. Filed May 14, 1958, Ser. No. 735,123

4 Claims. (Cl. 260—404.5)

This invention relates to foamed cellular materials and more particularly to cellular resin products that are semi-rigid or rigid and which display minimum shrinkage on curing.

In general, the cellular plastics heretofore prepared by reacting castor oil, a diisocyanate and a catalyst, with or without modifiers and additives, were semi-rigid or rigid foams which exhibited moderate to excessive shrinkage upon being cured. Such shrinkage is a serious disadvantage when the foams are formed in the positions they are to occupy, and such utilization is the major use for this type of foam. An example of such use is the filling of structural shapes in aircraft to impart increased structural strength or in wall cavities for strength plus insulation value.

It is an object of this invention to provide cellular plastic materials which have a uniform and small celled structure and which exhibit improved resistance to shrinking. A still further object of this invention is to provide cellular plastic material which can readily be formed in situ in the place where it is to be used and needed not be premolded.

The cellular plastic materials of this invention are prepared from the stable condensation polymer obtained by reacting castor oil, a partially epoxidized castor oil and an organic diisocyanate. The stable condensation polymer, for convenience, is herein referred to as the prepolymer. The prepolymer, which is a thick, syrupy liquid, is reacted with water to produce the plastic foam. The water reacts with unreacted isocyanate groups in the prepolymer to cause what is generally considered to be a chain extension of the polymer with the liberation of carbon dioxide, which due to the consistency of the prepolymer operates as a blowing agent to produce the plastic foam. This foam is self-curable on standing.

In carrying out the first step of the process, the prepolymer is prepared by combining the castor oil and partially epoxidized castor oil with an arylene diisocyanate. The mixture may be heated for one hour at 110° C. It has been found that when the mixture is heated at temperatures as high as 130° C. and above, the viscosity of the prepolymer is so high that it cannot be handled readily and gas evolution is suppressed. Temperatures from about 80° C. to about 120° C. may be used.

In general, arylene diisocyanates, as represented by the diisocyanates of the benzene and naphthalene series, or mixtures of these compounds may be employed. The present invention is useful in the production of a variety of urethane-type compounds. In addition to the arylene diisocyanate recited in Examples 1 and 2, other useful diisocyanates are: toluene-2,4-diisocyanate, m-phenylene diisocyanate, 1-chlorophenylene-2,4-diisocyanate, xenylene-4,4'-diisocyanate and naphthalene-1,5-diisocyanate, 3,3'-bitolylene-4,4'-diisocyanate, and diphenylene-4,4'-diisocyanate.

The partially epoxidized castor oil may be represented by any castor oil in which the unsaturated double bond has been reacted so as to be replaced by from 1% to 100% epoxy linkages. The preferred degree of epoxidation is one in which from about 20% to about 40% of the unsaturated double bond has been replaced by an epoxy group. These epoxidized castor oils and castor oil itself are used in weight proportion of about 10% to about 20% epoxidized castor oil and about 90% to about 80% castor oil, the preferred proportion being about 15%–16% epoxidized castor oil and about 85%–84% castor oil. It has been found that about 2.0 to about 3.0 NCO equivalents of the organic diisocyanate per equivalent of hydroxyl group in the mixture of castor oil and partially epoxidized castor oil may be used.

The foamed plastics which are obtained in the final step of this process are prepared by adding water and catalyst to the prepolymer. The amount of water which is added should be sufficient to react with the free isocyanate groups remaining after the preparation of the prepolymer but preferably not in too large an excess. When less than about 0.75 mol of water for each equivalent of free isocyanate group theoretically remaining in the prepolymer are used, insufficient gas is generated and the resulting foam is not as satisfactory as when more water is used. When more than 1.5 mols of water per isocyanate group theoretically remaining unreacted in the prepolymer are used, the excess water will temporarily remain in the foam and act somewhat as a plasticizer and therefore the use of too large an excess is not desirable.

It is frequently desirable to use a dispersing agent in the water as it is mixed with the prepolymer. Usually from 0.5% to 1.0% by weight of dispersing agent is sufficient. Any soap or surface active agent may be incorporated for this purpose when desired. Furthermore, foam control agents, such as various silicones may be used as a dispersing agent and to control the size of the bubbles and ensure uniformity thereof as well as stability of the foam.

Suitable catalysts for forming the foam from the prepolymer are various organic amines such as:

Dimethylamino ethanol
Triethylamine
Diethanolamine
Trimethanolamine
N-methyl morpholine
Diethylamino ethanol The foams made in accordance with the present invention exhibited excellent compression set, virtually no area shrinkage and unusually low loss of modulus on humid aging.

The following examples are given to illustrate the invention. The parts used are by weight, unless otherwise specified.

PREPARATION OF PREPOLYMERS

Procedure #1

The prepolymers are formed in a vessel by slowly adding the arylene diisocyanate to the castor oil-epoxidized castor oil mixture with stirring, heating to about 90° C. to 110° C. for about one hour, and then cooling to room temperature. During this heating, it is essential that the reaction mixture is protected from atmospheric moisture. This absence of moisture may be accomplished either by use of a drying agent on the exit of the vessel or by maintaining a moisture-free atmosphere of a dry inert gas, e.g., nitrogen.

Procedure #2

The prepolymer may also be formed by slowly adding the castor oil-epoxidized castor oil mixture to the arylene diisocyanate, heating to about 90° C. to 110° C. for about one hour, and then cooling to room temperature.

Using procedure #1 described above, the following examples illustrate the preparation of the prepolymer:

EXAMPLE 1

To a mixture of 305 g. of castor oil and 53 g. of epoxidized castor oil (hydroxyl value 225) was gradually added with agitation 242 g. of 2,4/2,6 (80:20 proportion by weight) toluene diisocyanate. Equivalents of diisocyanate per equivalent hydroxyl were 2.5:1. After the initial exotherm had subsided, the reaction mixture was heated to 110° C. for one hour. After cooling to room temperature the prepolymer had a viscosity of 330 poises.

EXAMPLE 2

A mixture of 414 g. of castor oil and 80 g. of epoxidized castor oil (hydroxyl value 196) was added to 366 of 2,4/2,6-toluene diisocyanate (80/20 ratio as above). Equivalents of diisocyanate per equivalent hydroxyl were 2.75:1. After the initial exotherm had subsided, the reaction mixture was heated to 110° C. for one hour. After cooling to room temperature the prepolymer had a viscosity of 156 poises.

PREPARATION OF FOAMED PLASTIC

EXAMPLE 3

0.35 ml. of water, 0.5 g. of dimethyl siloxane (Dow Corning DC-200) (50 cps.) and 4.4 ml. of a mixture of diethylethanolamine 42 g., 24 g. of 36.5% hydrochloric acid and 34 g. of distilled water added to 100 g. of the prepolymer of Example 1. The mixture was stirred thoroughly with a mechanical stirrer or paddle for about 20 to 45 seconds and quickly poured into a mold. After from 15 to 30 minutes standing at room temperature, the evolved $CO_2$ had foamed the plastic to maximum volume. Equivalents of water used per theoretically free NCO groups remaining in prepolymer were 1.01:1.00.

The product obtained has small, uniform cell structure. The surface of the block is a smooth, non-brittle skin. The foam is semi-rigid and non-friable, having a density of 3.0 pounds per cubic foot, and shows no shrinkage on standing.

Foams prepared exactly as in Example 3 but from prepolymers which do not contain epoxidized castor oil, but have the same isocyanate to hydroxyl equivalent ratios, showed 5 to 15% shrinkage on standing.

In the preparation of the prepolymer, the initial exotherm usually occurs in 15 to 30 minutes, and it is preferable to heat the reactants for approximately an hour after. Where the exotherm begins to exceed 100° C. in all, the reaction may be cooled by immersing the container in cold water or by other cooling methods. In the preparation of comparative test samples of prepolymers not involving this invention, discussed below, this cooling treatment permitted the preparation of certain prepolymers which could not otherwise be prepared.

In the following examples of various castor polyol foams, the following tests were used after the foams had been prepared by methods corresponding as closely as possible to those described in Examples 1-3. Tests were:

*Density.*—Density was obtained by taking the average of four samples weighed to the nearest thousandth of a gram on an analytical balance. The foam samples were cylindrical, measuring 1.00 inch in height by 2.00 inches in diameter, and were cut from cured foam (aged 7 days at 28° C.).

*Area shrinkage.*—Shrinkage was measured in terms of the percentage reduction in cross-sectional area of the formed foam referred to the container dimensions. The foam cross-sectional area was calculated from the foam dimensions as measured across the bottom (length and width distances were taken across the bottom where shrinkage was most evident). In cases of low shrinkage, the foam overflow was cut off across the top and confirming length and width measurements made across this top area.

*Compression modulus.*—A cylindrical sample of foam (1" × 2" dia.) was compressed between the pan of a triple beam laboratory balance and an immovable upper plate. Compression of the sample was plotted against the weight applied to the balance pan over a compression range of 5% to 6%. The average modulus in lb./in.$^2$ was taken as the compression modulus. For humid aging, samples were kept at 70° C. for 21 days at 100% R.H. in a desiccator.

*Compression set.*—Set was measured according to ASTM Method B.

TABLE I

*Properties of prepolymers and foams obtained from 85% castor oil and 15% of castor polyol*

[NCO/OH ratio 2.5/1; preparation of prepolymer at 110° C.]

| | Visc. of Prepolymer (poises at 25° C.) | Foam Density (lb./ft.$^3$) | Area Shrinkage, Percent | Compression Modulus (p.s.i.) | |
|---|---|---|---|---|---|
| | | | | Original | Humid Aged [1] |
| Propylene Glycol Mono Ricinoleate | 198 | 5.6 | 25.0 | 18.5 | 10.5 |
| Propylene Glycol Mono 12-Hydroxystearate | 196 | 3.0 | 8.0 | 21.5 | 16.5 |
| Neopentyl Glycol Diricinoleate | 110 | ([2]) | ([2]) | ([2]) | ([2]) |
| Ricinoleyl Ricinoleate | 96 | 2.9 | 17.5 | 14.2 | 11.0 |
| Dehydrated Castor Oil | 119 | -------- | 78.0 | -------- | -------- |
| Dehydrated Castor Wax | 134 | ([2]) | ([2]) | ([2]) | ([2]) |
| Acetylated Castor Oil | 178 | -------- | 31.5 | -------- | -------- |
| Ethylene Glycol Mono Ricinoleate | 179 | -------- | 48.5 | -------- | -------- |
| Ethylene Glycol Mono 12-Hydroxystearate | 260 | 3.2 | 3.5 | 22.0 | 17.5 |
| Triglyceride of Ricinoleic Acid | 80 | 2.9 | 10.0 | 19.0 | 10.0 |
| Triglyceride of 12-Hydrostearic | 221 | 2.7 | 25.0 | 16.5 | 10.0 |
| Epoxidized Castor Oil (Example 3) | 331 | 3.0 | 0.0 | 21.5 | 21.5 |
| Glyceryl Mono Ricinoleate | 297 | 5.5 | 20.0 | 21.0 | 20.0 |
| Glyceryl Mono 12-Hydroxystearate | 1,300 | 3.5 | 3.5 | 26.0 | 23.0 |
| Pentaerythritol Tetraricinoleate | 198 | 3.5 | 7.8 | 20.0 | 20.0 |
| Hydroxylated Castor Oil | ([3]) | ([3]) | ([3]) | ([3]) | ([3]) |
| Pentaerythritol Monoricinoleate | 340 | 3.2 | 17.8 | 22.0 | 18.5 |

[1] 3 weeks at 70° C./100% R.H.
[2] Foam Collapses.
[3] Foaming prevented prepolymer preparation.

It was found that when the present invention is practiced at 110° C., preparation time of the prepolymer may vary from 0.4 to at least 2.0 hours without significant increase in viscosity: whereas at 120° C. and 130° C. the viscosity of the prepolymer increases deleteriously. For example, at 130° C. two hours preparation time for the prepolymer results in a prepolymer having approximately 800 poises viscosity at 25° C.

It was also found that the viscosity drops off sharply in the preparation of the prepolymer when substantially less epoxy modified castor oil is incorporated in the mix with castor oil than 15% by weight epoxy polyol: 85% by weight castor oil. Similar critical results were obtained as to density, area shrinkage and compression modulus.

It was also found that in examples corresponding to Example 3, wherein other percentages of theoretically combinable water than 100% were utilized, area shrinkage increased materially. For example, at 50% theoretical water content in Example 3, area shrinkage went up to about 18%, and when 150% water was used the foam collapsed. Similarly, optimum density in pounds per cubic foot was obtained by utilizing in Example 3 substantially 100% theoretical water combined with the prepolymer. Also, optimum compression modulus in p.s.i., both with the originally prepared product of Example 3 and after aging for 21 days at 100% relative humidity at 70° C., was obtained when about 100% theoretical water by weight was used to form the foam from the prepolymer.

While the examples cited herein are but exemplary of the invention, it is to be understood that other modifications may be within the skill of those expert in this art and the scope of protection to be afforded hereby is to be measured in accordance with the following claims.

What is claimed is:

1. A process for producing cellular plastic material prepolymer which comprises reacting from about 2 to about 4 NCO equivalents of an arylene diisocyanate, per equivalent of hydroxyl group in a mixture of about 80 to 90 parts by weight of castor oil and about 10 to about 20 parts by weight of a partially epoxized castor oil, in the absence of atmospheric moisture at a temperature between about 80° C. and about 130° C.

2. A process for producing cellular plastic material prepolymer which comprises reacting from about 2 to about 4 NCO equivalents of an arylene diisocyanate, per equivalent of hydroxyl group in a mixture of about 85 parts by weight of castor oil and about 15 parts by weight of a partially epoxidized castor oil, in the absence of atmospheric moisture at a temperature between about 80° C. and about 130° C.

3. A process for producing cellular plastic material prepolymer which comprises reacting from about 2 to about 4 NCO equivalents of an arylene diisocyanate, per equivalent of hydroxyl group in a mixture of about 80 to 90 parts by weight of castor oil and about 10 to about 20 parts by weight castor oil epoxidized to from about 20% to about 40% of the normally unsaturated double carbon bond at a temperature between about 80° C. and about 130° C.

4. A process for producing cellular plastic material prepolymer which comprises reacting from about 2 to about 4 NCO equivalents of an arylene diisocyanate, per equivalent of hydroxyl group in a mixture of about 80 to 90 parts by weight of castor oil and about 10 to about 20 parts by weight of a partially epoxidized castor oil in the absence of atmospheric moisture at between about 100° C. and about 120° C.

References Cited in the file of this patent

UNITED STATES PATENTS

| | | |
|---|---|---|
| 2,569,502 | Swern et al. | Oct. 2, 1951 |
| 2,833,730 | Barthel | May 6, 1958 |

UNITED STATES PATENT OFFICE

CERTIFICATE OF CORRECTION

Patent No. 2,984,679                                                                May 16, 1961

Arthur Ehrlich et al.

It is hereby certified that error appears in the above numbered patent requiring correction and that the said Letters Patent should read as corrected below.

Column 1, line 36, for "needed" read -- need --; column 5, line 17, for "epoxized" read -- epoxidized --.

Signed and sealed this 5th day of December 1961.

(SEAL)
Attest:

ERNEST W. SWIDER                                        DAVID L. LADD
Attesting Officer                                           Commissioner of Patents

USCOMM-DC